Nov. 14, 1961  A. W. LAPINS ET AL  3,008,724
LEVELING CONTROL FOR HILLSIDE COMBINES
Filed Nov. 9, 1959  4 Sheets-Sheet 1

INVENTORS.
ALVIN W. LAPINS &
BY  RALPH L. TWEEDALE

ATTORNEYS.

INVENTORS.
ALVIN W. LAPINS &
BY   RALPH L. TWEEDALE

ATTORNEYS.

United States Patent Office 3,008,724
Patented Nov. 14, 1961

3,008,724
LEVELING CONTROL FOR HILLSIDE COMBINES
Alvin W. Lapins, Fresno, Calif., and Ralph L. Tweedale, Southfield, Mich., assignors to Massey-Ferguson Inc., Racine, Wis., a corporation of Maryland
Filed Nov. 9, 1959, Ser. No. 851,727
5 Claims. (Cl. 280—6.1)

The present invention relates to hillside combines, or similar equipment designed to move along sharply sloping ground, and concerns more particularly a control system for actuating the leveling mechanisms on such combines.

A hillside combine embodies the usual harvesting and threshing assemblies of a standard level ground combine but, in addition, is modified so as to permit operation along the sides of sloping fields. These modifications usually include the provision of a pivoted connection between the header assembly and the combine body, and providing vertical adjustable mountings for the front drive wheels of the machine. In addition, a control system is required for tilting the header assembly and raising and lowering alternate ones of the drive wheels so that, as the combine moves along the side of a slope, the header assembly will be parallel to the ground while the combine body will remain vertical. It is desirable to have the control system responsive to changing ground contours as the combine moves forward so that the combine is automatically adapted to the slope encountered.

Accordingly, it is the aim of the invention to provide a novel leveling control system for a hillside combine or like machine which is automatically responsive to changes in ground contour.

It is an object of the invention to provide a novel leveling control of the above kind which is dependable, rugged and easily adjusted and maintained, and hence is particularly well suited for agricultural equipment.

In more detail, it is an object to provide a novel automatic leveling control as described above in which a simple adjustment determines the sensitivity of the control to changes in slope.

It is also an object to provide a leveling control of the above character which, while being responsive to changes in slope, is not readily affected by vibration or jolting such as are normally associated with the movement of agricultural equipment.

Other objects and advantages of the invention will become apparent upon reading the following detailed description and upon reference to the drawings in which.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
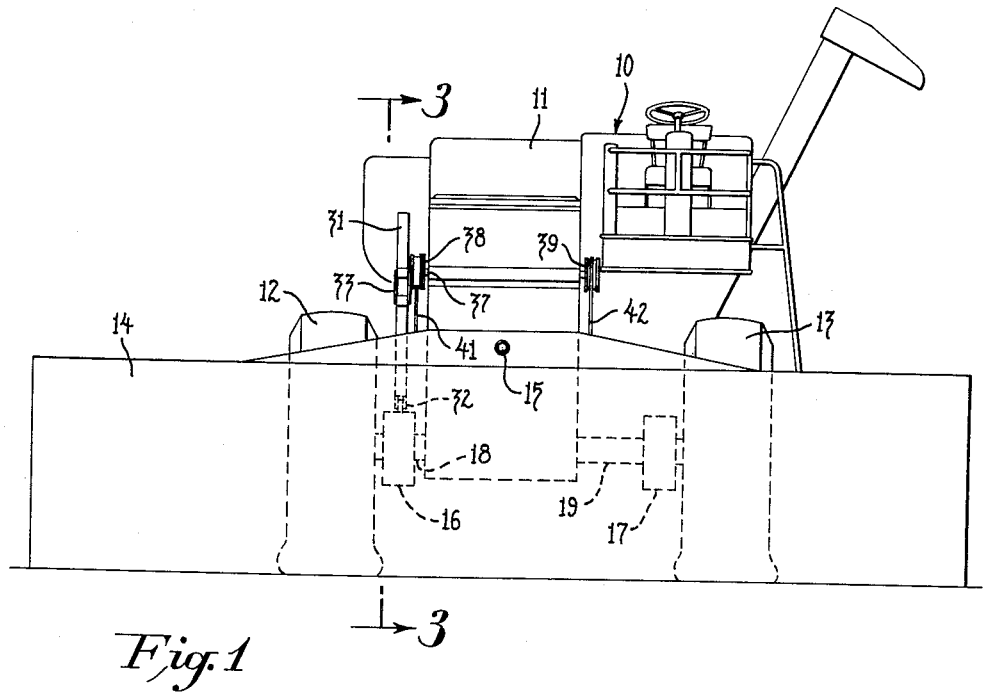
FIGURE 1 is a front elevation of a hillside combine of the type with which the leveling control system of the present invention is particularly useful.
Figure 2:
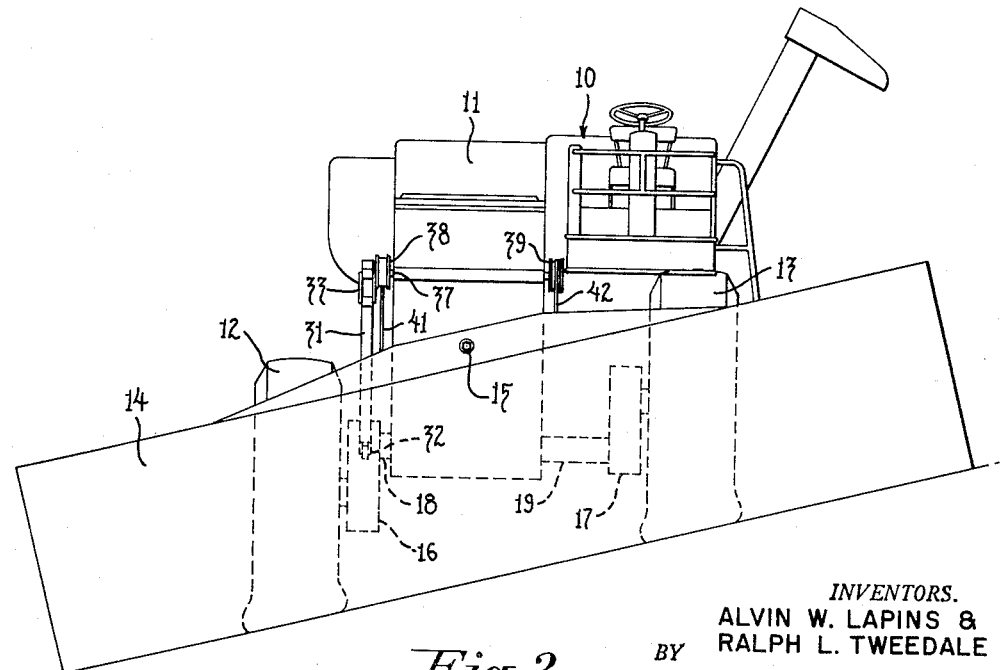
FIG. 2 is similar to FIG. 1 showing the combine moving along the side of a slope.

Turning now to FIGS. 1 and 2, there is shown a combine 10 of the hillside type with which the leveling control system of the present invention is particularly useful. The combine 10 includes a body or frame 11, vertically adjustable front drive wheels 12 and 13 and a pivoted header assembly 14 mounted for rotation about an axis defined by a bolt 15. As can be seen by comparing FIGS. 1 and 2, the combine 10 operates on sloping ground by pivoting the header assembly 14 about the axis 15 so that the header remains parallel to the ground while the front drive wheels 12, 13 are alternately raised or lowered so as to tilt the frame 11 relative to the ground surface and keep it vertical.

In order to mount the drive wheels 12, 13 for vertical adjustment, they are journaled at the forward ends of arms 16 and 17 respectively, which are pivoted at their rear ends to the frame 11 about shafts 18 and 19 respectively. For raising and lowering the wheels 12, 13, double-acting hydraulic actuators 21 and 22 are connected between the combine frame 11 and the respective arms 16, 17. The actuators 21, 22 are powered from a source of fluid pressure which, in the preferred embodiment, is a gear pump 25 of the three gear, double outlet type driven from the main power plant of the combine. The pump 25 draws in oil through a line 26 connected to a reservoir or sump 27 and discharges the fluid, at equal pressures, through lines 28 and 29.

In the illustrated embodiment, the pivoted header 14 is tilted by being coupled to the vertically swingable wheel supporting arm 16 so that as the wheel 12 is raised and lowered, the header 14 is appropriately tilted about its bolt axis 15. For details of this particular arrangement, reference may be had to copending U.S. patent application Serial No. 750,278, filed May 29, 1958, now Patent No. 2,947,134, and assigned to the assignee of the instant application. For purposes of the present disclosure it will be sufficient to observe that a rack 31 is secured at 32 to the forward end of the wheel supporting arm 16. The rack is constrained for reciprocating movement through a bracket 33 carried on the frame 11 where the rack teeth engage a pinion (not shown) secured to a shaft 34. The shaft 34 is coupled by chains 35 and 36 to a cross shaft 37 which carries a pair of pulley drums 38 and 39 on its opposite ends. Cables 41 and 42 are oppositely wrapped about the pulley drums 38 and 39 respectively, and are anchored to the header assembly 14 at points spaced from the pivot axis 15. The arrangement is such that upon swinging movement of the wheel supporting arm 16 downwardly, as in moving between the positions shown in FIG. 1 and FIG. 2, the rack 31 is drawn downwardly through the bracket 33 so as to turn the cross shaft 37 and pay out the cable 41 from the pulley drum 38 while winding the cable 42 about the pulley drum 39. This results in pivoting of the header assembly 14 about the bolt axis 15 in the proper direction.

Figure 6:
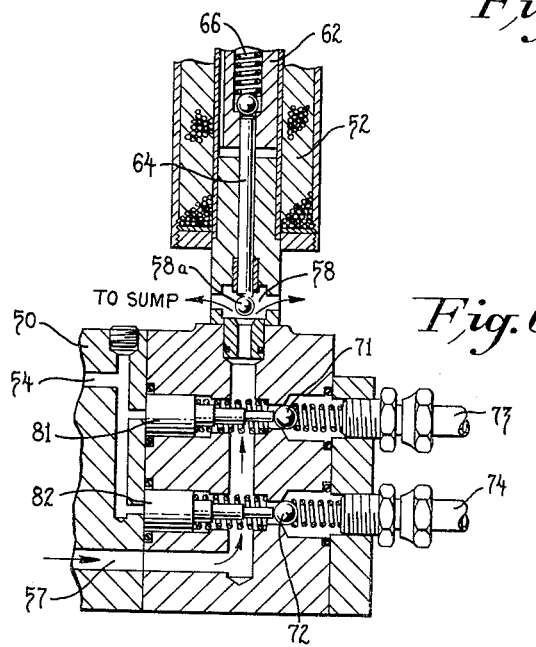
FIG. 6 is a fragmentary section similar to FIG. 5 showing the parts in an alternate operating position.

For powering the actuators 21, 22, the output lines 28, 29 from the pump 25 are coupled to the actuators through a valve 50 controlled by a pair of electrically actuated devices which, when alternately actuated, cause the actuators 21, 22 to be driven in opposite directions. In the preferred embodiment, the electrically actuated devices are solenoids 51 and 52 which are normally deenergized. The pump output line 29 is coupled to a port 53 in the valve 50, and the port 53 opens into a chamber 54 which communicates with the sump 27 through a check valve 55 controlled by the solenoid 51. When the solenoid is deenergized, the check valve 55 is free to open and allow hydraulic fluid from the pump output line 29 to return to the sump or reservoir 27. Similarly, the pump output line 28 is coupled to a valve port 56 which opens into a chamber 57 that communicates with the sump 27 through a check valve 58 controlled by the solenoid 52. When the solenoid 52 is deenergized, the check valve 58 is free to open (see FIG. 6) and fluid in the chamber 57 returns to the sump.

When the solenoids 51, 52 are energized, their respective armatures 61 and 62 are drawn downwardly urging rods 63 and 64 respectively against check valve elements 55a and 58a so as to close the check valves 55, 58 and prevent hydraulic flow therethrough. The solenoid armatures 61, 62 are coupled to their rods 63, 64 through springs 65, 66 respectively so that a biased lost-motion connection is provided between the solenoid armatures and the valve controlling rods. The purpose of this connection will become clear below.

Upon actuating, that is energizing the solenoid 52 (see FIG. 5), direct fluid exhaust from the valve intake port 56 is blocked since the energized solenoid closes the check valve 58. Pressure is thus built up in the chamber 57 so as to unseat spring biased check valve elements 71 and 72 and cause fluid under pressure to flow into lines 73 and 74. In this way, hydraulic pressure is introduced into the actuators 21 and 22 tending to raise the wheel supporting arm 17 and lower the wheel supporting arm 16.

Figure 5:
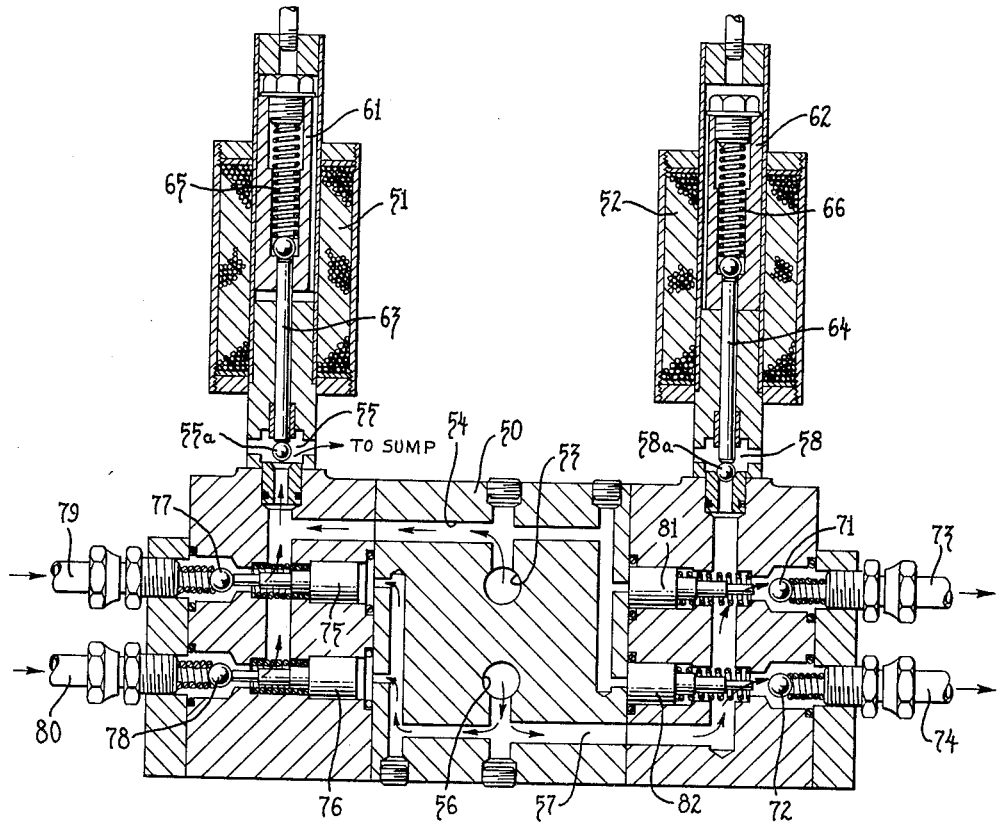
FIG. 5 is a section of a valve forming a part of the system appearing in FIG. 4.

The pressure buildup in the chamber 57 also acts on a pair of valve controlling pistons 75 and 76 which are biased to the right in FIG. 5. When the pressure buildup in the chamber 57 is sufficient to overcome the spring bias on the pistons 75 and 76, the pistons move to the left in FIG. 5 and unseat the biased check valve elements 77 and 78 respectively. This opens the associated check valves and allows fluid to return through the lines 79, 80 from the actuators 22 and 21 respectively.

It can be seen that the force holding the check valve 58 closed when the solenoid 52 is energized is transmitted through the spring 66 so that if a greater hydraulic force is developed within the chamber 57, the check valve element 58a will be unseated. Thus, the check valve 58 serves as a pressure relief valve in the system.

When the solenoid 52 is deenergized (see FIG. 6), the check valve 58 is again released allowing hydraulic fluid to be dumped from the chamber 57 directly to the reservoir or sump. The biased check valve elements 71, 72 move to their valve closing positions so as to block off the lines 73, 74, and the drop in pressure within the chamber 57 allows the pistons 75, 76 to return to their initial positions permitting the check valve elements 77 and 78 to close.

When the solenoid 51 is energized, the action is similar to that described in connection with the energization of solenoid 52. That is, the valve 55 is closed allowing a pressure buildup to occur in the chamber 54. This pressure buildup unseats the biased check valve elements 77, 78 and discharges fluid under pressure into the lines 79, 80. The pressure buildup also acts on a pair of biased pistons 81, 82 which, when moved to the right in FIG. 5, unseat the check valve elements 71 and 72 and allow fluid to return from the actuators through the line 73, 74. The lost-motion connection between the armature 61 of the solenoid 51 and the rod 63 allows the valve 55 to serve as a pressure relief for the chamber 54.

In accordance with the invention, an improved control circuit is provided for the solenoids 51, 52 which automatically energizes the proper solenoid upon tilting of the combine so as to provide appropriate positioning of the wheel carrying arm 16, 17. For sensing the angular position of the combine, the control circuit includes a mercury switch 85 containing a mercury reservoir 86 and a vertically disposed column of mercury 87 at one side of the reservoir. Preferably, the switch 85 takes the form of a plastic panel 85a having appropriate passages formed therein to receive and confine the mercury to the reservoir 86 and column 87. The switch 85 is mounted transversely on the combine body 11 so that tilting of the combine body to the left as seen in FIGS. 1 and 2 will cause the mercury to rise in the column 87, while tilting the combine to the right in FIGS. 1 and 2 will cause the mercury level in the column 87 to drop.

Connected as a terminal in the switch 85 is a first electrode 88 which is disposed in electrical contact with the mercury at the bottom of the column 87 and which is coupled to an electric power source which, in the illustrated embodiment, is the battery 89 of the combine. A second switch terminal takes the form of a second electrode 91 mounted just above the top surface of the mercury in the column 87, assuming the combine body 11 to be level. The electrode 91 is coupled to the solenoid 52 so that contact between the mercury in the column 87 and the electrode 91 is effective to complete a circuit energizing the solenoid. The circuit for energizing the solenoid 52 includes battery 89, electrode 88, mercury column 87, electrode 91 and ground connections 92 and 93.

The switch 85 includes a third terminal in the form of a third electrode 94 disposed in contact with the mercury in the column 87 just beneath the top surface thereof. The electrode 94 is coupled to the solenoid 51 so that breaking of electrical contact between the mercury and this electrode results in energization of the solenoid. This is accomplished by coupling the electrode 94 to a normally open relay 95 which controls a set of contacts 96 in a direct circuit with the solenoid 51. So long as there is contact between the electrode 94 and the mercury column 87, the relay 95 remains energized and the contacts 96 are held open. When contact between the mercury column 87 and the electrode 94 is broken, the relay 95 is dropped out so that the contacts 96 close and a circuit is completed from the battery 89 energizing the solenoid 51.

In order to easily adjust the ground slope response sensitivity of the leveling control circuit and to equalize the sensitivity of the circuit to tilting of the combine body both to the right and to the left, the electrode 91 is mounted for vertical adjustment and the panel 85a is mounted for angular adjustment about an axis extending generally fore-and-aft of the combine. In the illustrated embodiment, the electrode 91 is carried by a threaded member 101 and rotational adjustment of the member vertically positions the electrode. The switch panel 85a is pivoted on a pivot bolt 102 and is locked in place by a locking bolt 103 received in an arcuate slot 104 formed in the switch panel. By loosening the bolt 103, the switch 85 can be angularly adjusted about the pivot bolt 102.

It will be appreciated that the ground slope response sensitivity of the control system is dependent upon the vertical spacing between the electrodes 91 and 94, while equal sensitivity to right and left hand tilting is obtained by positioning the top surface of the mercury column 87 equidistant between the electrodes 91 and 94. The electrodes 91 and 94 are in close proximity so that it is quite a simple matter for the combine operator or service man to vertically adjust the electrode 91 and pivot the switch 85 so as to provide the desired degree of sensitivity in the control system.

As a feature of the invention, the mercury column 87 is provided with an upper branch 110 which is coupled to the main portion of the mercury column by a restrictive passage 111. The restrictive passage 111 is effective to dampen vibrations in the mercury column 87 and prevent mercury from being splashed up into contact with the electrode 91 so as to produce a false actuating signal in the control system.

In the preferred embodiment, condensers 112 and 113 are provided to minimize arcing between the mercury and the electrodes 91 and 94 by shunting the mercury-electrode contacts to ground. Also in the preferred embodiment, the switch 85 is by-passed by a pair of manually operable pushbuttons 114 and 115 which, upon manual operation, complete circuits which energize the solenoids 51 and 52 respectively. When the manual control buttons 114, 115 are to be utilized, a switch 116 is opened to disconnect the switch 85 and thus prevent automatic operation of the control system.

Figure 3:
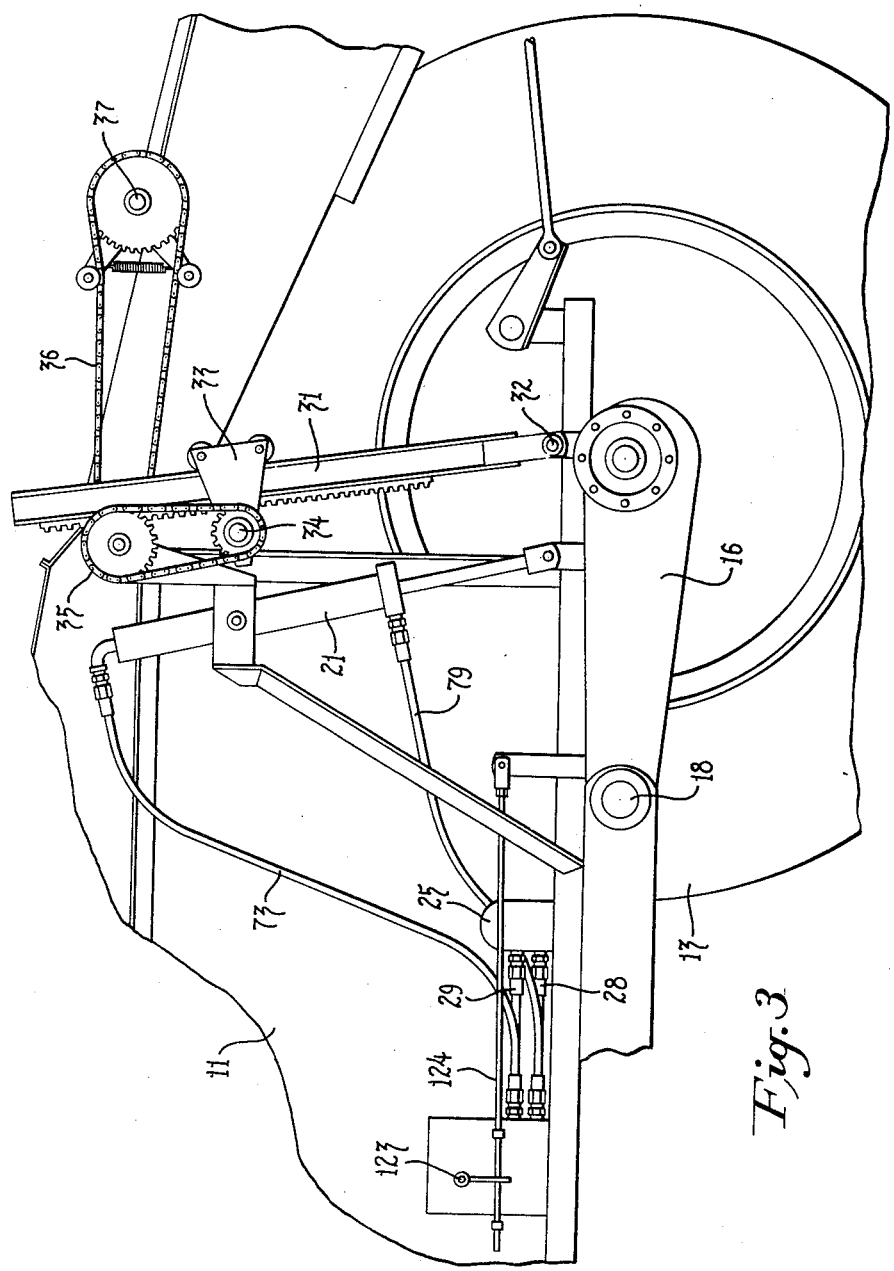
FIG. 3 is an enlarged fragmentary section taken approximately along the line 3—3 of FIG. 1.
Figure 4:
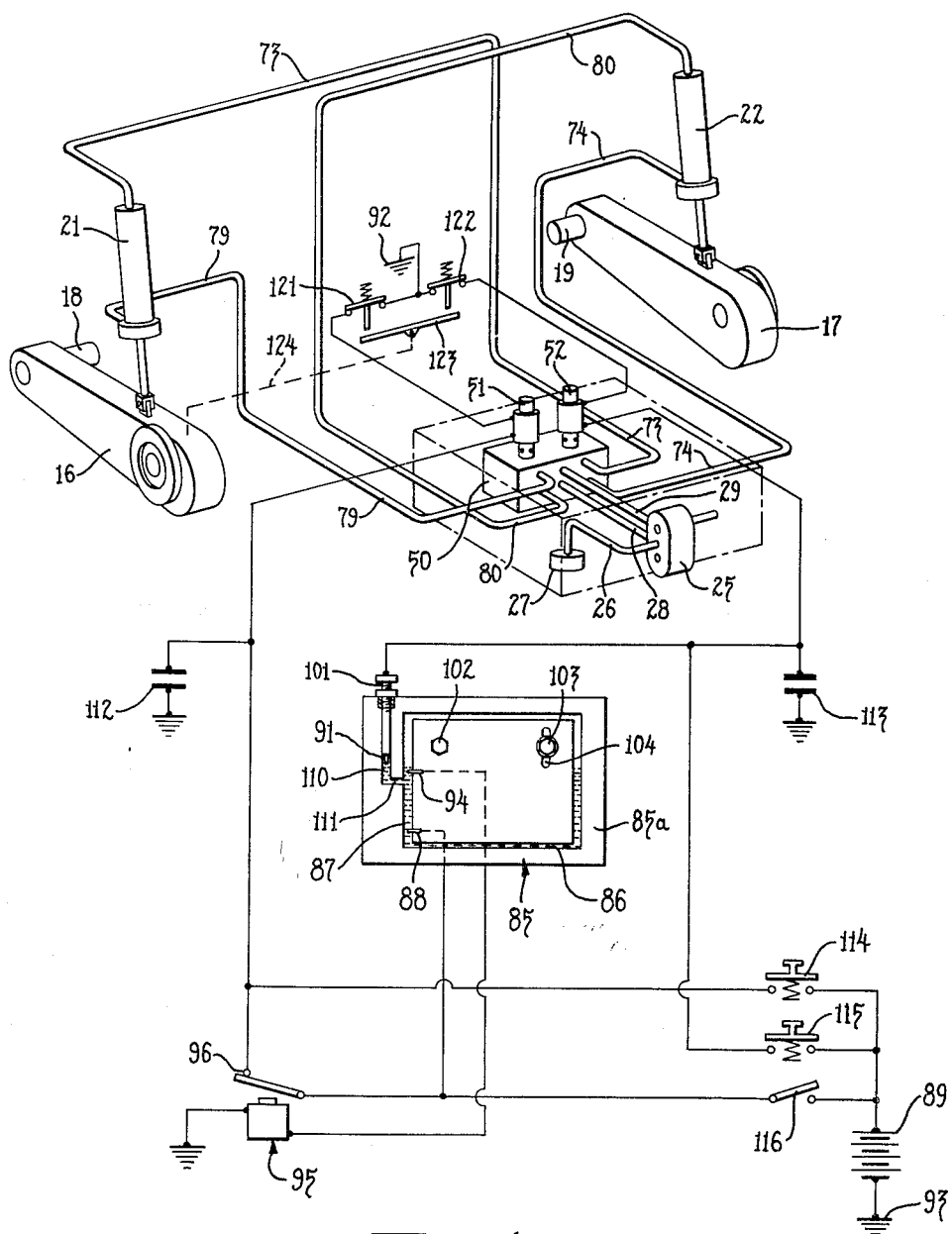
FIG. 4 is a diagrammatic view of a control system constructed in accordance with the invention as embodied in the combine of FIG. 1.

To prevent over-tilting of the combine body 11, a pair of limit switches 121 and 122 are provided in series with the circuits energizing the solenoids 51 and 52 respectively. The switches 121, 122 are operated by a tiltable member 123 coupled by a rod 124 (see also FIG. 3) to the wheel supporting arm 16. The arrangement is such that when the wheel arm 16 drops down to its fully lowered position, the member 123 is rocked so as to open the switch 122 and thus deenergize the solenoid 52 and interrupt further downward movement of the arm 16. Conversely, as the arm 16 reaches the upper limit of its travel, the element 123 is rocked in the opposite direction so as to open the switch 121 and deenergize the solenoid 51.

The operation of the leveling control system described above will be apparent from an understanding of its structure. However, to briefly summarize the operation of the disclosed machine, it will be recalled that the combine 10 is provided with vertically adjustable front drive wheels 12 and 13 and a tiltable header assembly 14 so that the combine may operate along the side of sloping ground with the combine body 11 remaining upright. Assuming that the combine moves from level ground as shown in FIG. 1 onto ground which slopes to the left as shown in FIG. 2 and that the automatic operation switch 116 is closed, it will be understood that as the combine moves onto the sloping ground the combine body 11 will initially tilt to the left as seen in these figures so that the mercury in the switch 85 will rise in the column 87 and contact the electrode 91. Contact between the electrode 91 and the mercury completes a circuit from the battery 89 which energizes the solenoid 52, and energization of this solenoid closes the check valve 58 and causes hydraulic fluid under pressure from the pump 25 to be directed to the lines 73 and 74. Virtually simultaneously, the pressure buildup in the chamber 57 which results in the flow of fluid pressure through the line 73, 74 acts upon the pistons 75, 76 so as to open the check valves and permit hydraulic fluid to return to the valve 50 through the line 79, 80. Thus, energization of the solenoid 52 causes the hydraulic actuator 22 to raise the wheel supporting arm 17 while the actuator 21 is driven so as to lower the arm 16. Downward movement of the arm 16 pulls the rack 31 downwardly through the bracket 33 and, through the cables 41, 42 and their associated structure, results in tilting of the header assembly 14. The opposite movement of the wheel carrying arms 16, 17 continues until the combine body 11 is swung from its tilted position back to a substantially vertical position whereupon the electric circuit between the mercury column 87 and the electrode 91 is broken and the solenoid 52 deenergized.

When the combine 10 moves from the slope shown in FIG. 2 back to the level ground shown in FIG. 1, it will be appreciated that the combine body 11 will initially be tilted toward the right and this will cause separation between the mercury column 87 and the electrode 94. As soon as the circuit is broken between the electrode 94 and the mercury column, the relay 95 drops out so as to complete the circuit which energizes the solenoid 51. Energization of this solenoid directs hydraulic fluid under pressure from the pump 25 through the lines 79, 80 so that the actuator 21 lifts the wheel supporting arm 16 and the actuator 22 lowers the arm 17 with the result that the combine is restored to its normal level ground operating condition.

As has been stated above, the sensitivity of the switch 85 to changes of slope can be easily controlled by adjusting the vertical position of the single electrode 91 and the angular position of the switch panel 85a. Those skilled in the art will also appreciate that the control system disclosed is quite simple in design so as to be, in practice, dependable and rugged.

We claim as our invention:

1. A hillside combine having right and left vertically adjustable ground engaging wheels mounted on a frame, comprising, in combination, means for raising and lowering alternately said right and left wheels so as to tilt the combine frame relative to the ground, a pair of electrically actuated devices connected to said means for causing, when alternately actuated, said means to tilt the frame to the right or left respectively, means on said frame containing a mercury reservoir including a generally vertically disposed column of mercury at one side of said reservoir, a first electrode disposed above said mercury column and coupled to one of said devices so that contact between the mercury and the electrode will actuate said one device, and a second electrode disposed in contact with said mercury column below the top surface thereof, said second electrode being coupled to the other of said devices so that breaking of the contact between said electrode and the mercury will actuate the other one of said devices.

2. A hillside combine having right and left vertically adjustable ground engaging wheels mounted on a frame, comprising, in combination, means for raising and lowering alternately said right and left wheels so as to tilt the combine frame relative to the ground, a pair of electrically actuated devices connected to said means for causing, when alternately actuated, said means to tilt the frame to the right or left respectively, a panel adjustably mounted about a generally fore-and-aft axis on said frame, said panel containing a mercury reservoir including a generally vertically disposed column of mercury at one side of said axis, a first electrode mounted for vertical adjustment above said mercury column and coupled to one of said devices so that contact between the mercury and the electrode will actuate said one device, and a second electrode disposed in contact with said mercury column below the top surface thereof, said second electrode being coupled to the other of said devices so that breaking of the contact between this electrode and the mercury will actuate the other one of said devices.

3. A hillside combine having right and left vertically adjustable ground engaging wheels mounted on a frame, comprising, in combination, means for raising and lowering alternately said right and left wheels so as to tilt the combine frame relative to the ground, a pair of electrically actuated devices connected to said means for causing, when alternately actuated, said means to tilt the frame to the right and left respectively, means on said frame containing a mercury reservoir including a generally vertically disposed column of mercury at one side of said reservoir, said means also defining a second column of mercury closely adjacent the first column and connected thereto by a restrictive passage so that vibration in the mercury of said reservoir is dampened in being transmitted to said second column, a first electrode disposed above said mercury column and coupled to one of said devices so that contact between the mercury and the electrode will actuate said one device, and a second electrode disposed in contact with said mercury column below the top surface thereof, said second electrode being coupled to the other of said devices so that breaking of the contact between this electrode and the mercury will actuate the other one of said devices.

4. A hillside combine having right and left vertically adjustable ground engaging wheels mounted on a frame, comprising, in combination, fluid pressure actuators for raising and lowering alternately said right and left wheels so as to tilt the combine relative to the ground, a source of fluid pressure, means including a valve coupling said fluid pressure source to said actuators, a pair of electrically actuated devices for controlling said valve, said devices, when alternately actuated, causing said actuators to alternately raise or lower said wheels and thus tilt the frame to the right or left, means on said frame containing a mercury reservoir including a generally vertically disposed column of mercury at one side of said reservoir, a first electrode disposed above said mercury column and coupled to one of said devices so that contact between the mercury and the electrode will actuate said one device, and a second electrode disposed in contact with said mercury column below the top surface thereof, said second electrode being coupled to the other of said devices so that breaking of the contact between this electrode and the mercury will actuate the other one of said devices.

5. A hillside combine having right and left vertically adjustable ground engaging wheels mounted on a frame, comprising, in combination, means for raising and lowering alternately said right and left wheels so as to tilt the combine frame relative to the ground, a pair of electrically actuated devices connected to said means for causing, when alternately actuated, said means to tilt the frame to the right or left respectively, means on said frame containing a mercury reservoir including a generally vertically disposed column of mercury at one side of said reservoir, a source of electric power coupled to said mercury, a first electrode disposed above said mercury column and coupled in a normally open circuit to one of said devices so that contact between the mercury and the electrode will actuate said one device, a second electrode disposed in contact with said mercury column below the top surface thereof, and a normally energized relay coupled to the other of said devices so that deenergizing the relay will actuate the other of said devices, said second electrode being coupled to said relay so that breaking of the contact between said electrode and the mercury will deenergize the relay and thus actuate the other of said devices.

References Cited in the file of this patent

UNITED STATES PATENTS

| | | |
|---|---|---|
| 1,640,695 | Dolly | Aug. 30, 1927 |
| 2,108,791 | Alden | Feb. 22, 1938 |
| 2,756,062 | Thixton | July 24, 1956 |
| 2,801,511 | Vogelaar | Aug. 6, 1957 |
| 2,872,200 | Kroll | Feb. 3, 1959 |